United States Patent
Cheng et al.

(10) Patent No.: US 10,613,478 B2
(45) Date of Patent: Apr. 7, 2020

(54) IMAGING METHOD OF STRUCTURED ILLUMINATION DIGITAL HOLOGRAPHY

(71) Applicant: National Taiwan Normal University, Taipei (TW)

(72) Inventors: Chau-Jern Cheng, Taipei (TW); Xin-Ji Lai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 194 days.

(21) Appl. No.: 15/816,199

(22) Filed: Nov. 17, 2017

(65) Prior Publication Data

US 2019/0049896 A1 Feb. 14, 2019

(30) Foreign Application Priority Data

Aug. 8, 2017 (TW) .............................. 106126787 A

(51) Int. Cl.
*G03H 1/12* (2006.01)
*G03H 1/00* (2006.01)
(Continued)

(52) U.S. Cl.
CPC ........... *G03H 1/0005* (2013.01); *G03H 1/041* (2013.01); *G03H 1/0443* (2013.01);
(Continued)

(58) Field of Classification Search
CPC .......... G02B 5/32; G03H 1/00; G03H 1/0005; G03H 2001/005; G03H 2001/0083; G03H 1/02; G03H 2001/0204; G03H 2001/0208; G03H 201/0216; G03H 1/04; G03H 1/0402; G03H 1/0404; G03H 1/0406; G03H 1/041; G03H 1/0443; G03H 2001/0445; G03H 2001/0447; G03H 2001/045; G03H 2001/0452; G03H 2001/0454;
(Continued)

(56) References Cited

U.S. PATENT DOCUMENTS

| 10,156,829 B2 * | 12/2018 | Sato ..................... G02B 21/365 |
| 2009/0322738 A1 * | 12/2009 | Cable ................... G03H 1/0808 345/419 |
| 2011/0025870 A1 * | 2/2011 | Baraniuk ................ H04L 25/20 348/222.1 |

OTHER PUBLICATIONS

Xin-Ji Lai, et al., "Low-frequency moire fringes synthesize by mutual correlation for resolution enhancement in structured illumination digital holographic microscopy," OSA Digital Holography & 3-D Imaging Meeting, May 29, 2017, 3 pages, Jeju Island, South Korea.

* cited by examiner

*Primary Examiner* — Arnel C Lavarias
(74) *Attorney, Agent, or Firm* — Muncy, Geissler, Olds & Lowe, PC

(57) ABSTRACT

A method of structured illumination digital holography includes: (a) providing a structured illumination generating unit and binarization random number encoding unit to generate a coded structured illumination pattern; (b) sampling at least two patterns with phase shift which synthesized as a single structured illumination pattern to be encoded; (c) forming a single digital hologram, and wavefront reconstructing the single digital hologram; (d) performing a compressive sensing approach to recover the object wave with at least two phase shift patterns; and (e) reconstructing the separation of overlap spectrum, to obtain an image covering bandpass spectrum with different high frequency and low frequency.

8 Claims, 18 Drawing Sheets

(51) Int. Cl.
   *G03H 1/04*      (2006.01)
   *G03H 1/16*      (2006.01)
(52) U.S. Cl.
   CPC .............. *G03H 1/0465* (2013.01); *G03H 1/16*
      (2013.01); *G03H 2001/005* (2013.01); *G03H*
      *2001/045* (2013.01); *G03H 2001/0445*
      (2013.01); *G03H 2001/0447* (2013.01); *G03H*
      *2001/0452* (2013.01); *G03H 2001/0458*
      (2013.01); *G03H 2223/12* (2013.01); *G03H*
      *2225/31* (2013.01)
(58) Field of Classification Search
   CPC .............. G03H 2001/0456; G03H 1/08; G03H
      1/0866; G03H 2001/0883; G03H 1/10;
      G03H 1/16; G03H 1/22; G03H 1/26;
      G03H 2210/40; G03H 2210/44; G03H
      2223/50; G03H 2223/52; G03H 2223/53;
      G03H 2223/54; G03H 2223/55; G03H
      2226/00; G03H 2226/02
   USPC ........ 359/1, 3, 9, 10, 11, 15, 21, 22, 29, 30,
      359/31, 32, 33, 35; 430/1, 2
   See application file for complete search history.

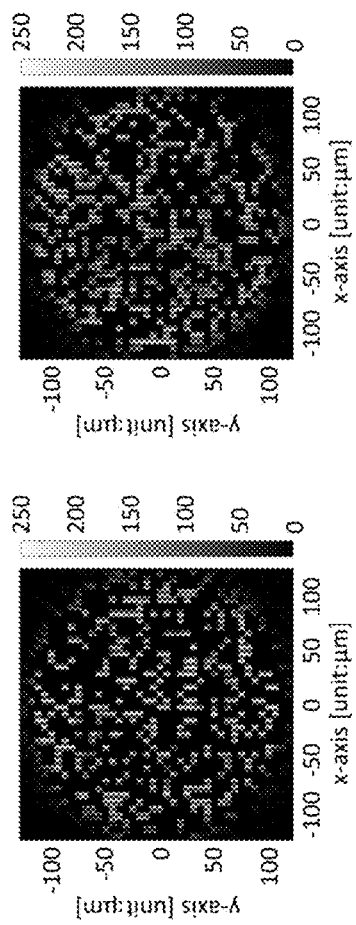

IMAGING METHOD OF STRUCTURED ILLUMINATION DIGITAL HOLOGRAPHY

TECHNICAL FIELD

The present invention relates to a digital holographic microscopy, and more particularly, to a method and apparatus of structured illumination digital holography by utilizing structured illumination object wave to interfere with reference wave for wavefront recording, and reconstructing microscopic and tomographic image of the object to be measured.

BACKGROUND

Digital holographic microscopy is one of the most widely techniques for quantitative phase imaging in recent years. It can realize the object reconstruction of numerical focus, and has the ability of quantitative phase analysis at sub-wavelength level. However, it is also affected by the optical diffraction limit, so that the wavelength of light source and the limited aperture size will limit the spatial resolution, and can't break through the lateral resolution limit of half-wavelength between two points. Therefore, synthetic aperture digital holographic microscopy is proposed for improving spatial resolution of the optical system, the method includes: placing diffraction grating to modulate high-frequency information of object, mechanical movement of image sensor to capture the wide field diffraction information, and using angular multiplexing to capture the high frequency information of object at various angles in order to enhance the spatial resolution.

At present, the lateral resolution can reach 90 nm (nanometer) in the technical field of synthetic aperture, which is utilizing complex amplitude deconvolution approach to complete the sub-micron wavefront reconstructing of object. It is a method of synthesizing aperture to use the mechanical galvanometer to rotate incident angle of the beam to scan the object. However, such mechanical scanning will cause additional perturbations and can't precisely adjust the incident angle, which will limit the axial phase accuracy.

Therefore, the structured illumination digital holographic microscopy is proposed to realize the synthetic aperture method without mechanical scanning, which method includes using a diffraction grating for the incident light separating into the zero order ($0^{th}$) and a positive one and negative one order diffraction ($\pm 1^{st}$) terms, placing a pinhole filter to filter out the negative first-order diffraction ($-1^{st}$) term, filtering out the zero order diffraction ($0^{th}$) to output low frequency plane reference wave, and interfering with positive one order diffraction ($+1^{st}$) term of the object diffracted wave to form a hologram. In addition, there is using a liquid crystal spatial light modulator to replace the diffraction grating, which reconstructs wavefront information by shooting a series of holographic images and using a phase retrieval algorithm.

However, the structured illumination digital holographic microscopy system requires using complex optical architecture to avoid crosstalk of individual frequency bands, and using projection patterns of the structured illumination to implement temporal phase shift, which can't perform synthesis spectrum expanding for resolution enhancement of the object in single exposure. It will make the measurement system sensitive to environmental perturbation so that the axial phase accuracy is reduced, and the complex recording process does not achieve spatial resolution enhancement.

In addition, due to the spectrum overlap of bandpass spectrum of object wave, it needs through taking at least two sheets of phase shift patterns to separate the spectral overlap, and thereby solving the problem of spectrum overlap and reconstruct the bandpass spectrum of different high frequency and low frequency. However, such time multiplexing will make the axial phase accuracy susceptible to environmental vibration and therefore affect the signal-to-noise ratio of the reconstructed images.

However, at present, there are some drawbacks in digital holograph technology for industrial applications. It is necessary to develop a novel structured illumination digital holograph technology to solve the above problems.

SUMMARY OF THE INVENTION

The invention proposes a method and apparatus of structured illumination digital holography, which does not need to use complex optical architecture to avoid frequency band crosstalk, and can realize the object wavefront reconstruction of resolution enhancement, with real-time operating potential.

The invention uses structured illumination for illuminating an object for generating Moiré fringes to make digital holographic recording, and uses spatial frequency structured illumination, as well as performing convolution and correlation between the Moiré fringes of the test object to complete image reconstruction and enhance resolution.

In this invention, a method of structured illumination digital holography is provided, and the method comprises: (a) providing a structured illumination generating unit and a binary random number encoding unit to generate a structured illumination pattern; (b) based-on at least two sheets of binary random number encoding patterns of said structured illumination pattern, sampling at least two sheets of patterns with phase shift to be synthesized as a single sheet of structured illumination pattern to be encoded; (c) interfering an encoded structured object wave with a reference wave to form a single sheet of digital hologram, and wavefront reconstructing said single sheet of digital hologram; (d) binary random number decoding said single sheet of digital hologram to extract object wave with corresponding original phase shift pattern, and performing an image processing approach to recover object wave with at least two sheets of phase shift patterns to obtain an image covering bandpass spectrum with different high frequency and low frequency; and (e) reconstructing separation of overlap spectrum of said object wave with at least two sheets of phase shift patterns.

The structured illumination generating unit and the binary random number encoding unit include a spatial light modulator, digital micromirror device. The encoded structured object wave is formed by the single sheet of encoded structured illumination pattern illuminating an object. The bandpass spectrum with different high frequency and low frequency includes two-dimensional or three-dimensional Fourier spectrum.

The image processing approach in said step (d) includes a compressive sensing approach, a de-convolution approach or an interpolation approach.

An apparatus of structured illumination digital holography comprises a light source; a beam expander to expand light generated by the light source to form an expansion beam; at least one beam splitter for splitting the light into two light beams or combining at least two light beams; a structured illumination generating unit to form a structured illumination pattern; a binary random number encoding unit to form a binary random number encoding pattern; an illumination objective lens set to amplify or reduce the structured illumination for illuminating on an object to be measured to form an object wave; a receiving objective lens set to amplify or reduce the structured illumination for the object wave to form an imaging or non-imaging diffraction wave; a reference beam for interfering with the object wave to foil's a structured illumination digital hologram; and a photodetector array or an image sensor to record the structured illumination digital hologram.

The digital hologram is generated in an on-axis, off-axis, in-line or a common-path optical scheme.

The apparatus further comprises a plurality of mirrors for changing optical path of the light source, and an optical relay system to modulate high frequency or low frequency of the object wave for facilitating optical multiplexing. The binary random number encoding pattern is amplitude form or phase form, and the structured illumination is amplitude form or phase form.

An apparatus of structured illumination digital holography comprises a light source; a beam expander to expand light generated by the light source to form an expansion beam; at least one beam splitter for splitting the light into two light beams or combining at least two light beams; a plurality of mirrors for changing optical path of the light source; a structured illumination generating unit to form a structured illumination pattern with arbitrary spatial frequency and arbitrary orientation; a random number encoding unit to form a random number encoding pattern with arbitrary spatial frequency and arbitrary orientation; an illumination objective lens set to amplify or reduce the structured illumination for illuminating on an object to be measured to form an object wave; a receiving objective lens set to amplify or reduce the structured illumination for the object wave to form an imaging or non-imaging diffraction wave; a reference beam for interfering with the object wave to form a structured illumination digital hologram; and a photodetector array or an image sensor to record the structured illumination digital hologram.

According to one aspect, the apparatus further comprises an optical relay system to modulate the object wave for facilitating optical multiplexing of different diffraction orders, and a grating configured on one side of said optical relay system to create the object wave at different diffraction orders.

According to another aspect, the apparatus further comprises a second optical relay system, a filtering mask and a grating, wherein the grating is configured between the receiving objective lens set and the second optical relay system. The filtering mask is configured between two lenses set of the second optical relay system.

According to yet another aspect, the apparatus further comprises a second optical relay system and a grating, wherein the grating is configured on one side of the second optical relay system, and a filtering mask is configured into the grating.

BRIEF DESCRIPTION OF THE DRAWINGS

The components, characteristics and advantages of the present invention may be understood by the detailed descriptions of the preferred embodiments outlined in the specification and the drawings attached:

FIG. 10A and FIG. 10B illustrate the extracted object wave with corresponding original phase shift pattern with 0 degree phase shift and 120 degree phase shift, respectively by binary random number decoding;

DETAILED DESCRIPTION

Figure 1:
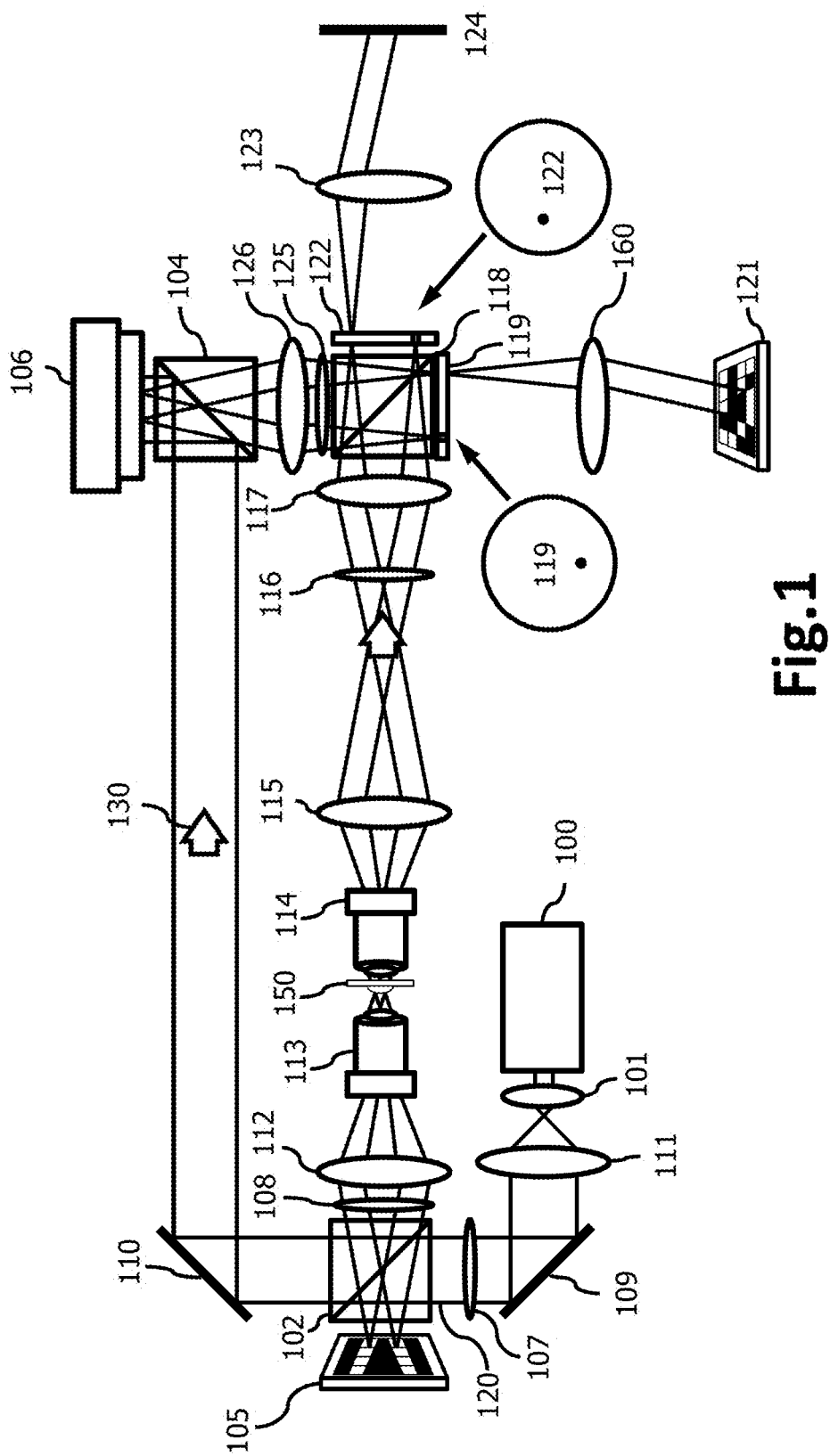
FIG. 1 illustrates an apparatus of structured illumination digital holography according to one embodiment of the present invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The invention uses structured illumination for illuminating a sample (object) to be measured to produce a Moiré pattern or Moiré fringes for digital holographic recording, and utilizes the specified spatial frequency structured illumination, as well as the convolution and correlation between the Moiré fringes of the sample (object) to complete image reconstruction and improve resolution of image.

The apparatus of the invention includes at least one structured illumination for illuminating a sample (object) to be measured to produce Moiré fringes; at least one reference light; and at least one digital holographic wavefront access unit.

The proposed method performs mutual correlation and spectrum separation operation of digital holographic reconstruction images of Moiré fringes of low spatial frequency at individual frequency bands, and of high spatial frequency structured illumination to complete the displacement spectrum correction and spectrum overlapping, in order to achieve the resolution enhancement image reconstruction of spectrum expanding. In some embodiments, phase shift and rotation angle of the spatial frequency structured illumination are controlled for repeatedly exposing, and utilizes the singular value decomposition (SVD) and the pseudo-inverse matrix operation to separate the crosstalk of individual frequency bands created by the structured illumination. Then, the mutual correlation operation of the object to be measured and the digital holographic reconstruction images of Moiré fringes of low spatial frequency at individual frequency bands are performed to achieve the spectrum expansion.

The embodiments of the invention indicate the holographic images created by interfering object wave of Moiré fringes of low spatial frequency scattering by the measured object with plane/spherical reference beam, interference and the formation of digital holographic, and utilizes phase shift and rotation angle of the spatial frequency structured illumination for repeatedly light exposing to achieve the separation of bands crosstalk interference.

The invention provides a method and apparatus of structured illumination digital holography in order to satisfy the requirements for resolving the prior art's drawbacks. The holographic image is processed by computer numerical reconstruction to become the complex image, including amplitude and phase information, which is not restricted by pixels and pixel size of photodetector array.

The present invention utilizes a spatial light modulator to generate a single sheet of structured illumination with encoded pattern, and uses a compressive sensing algorithm to recover at least two sheets object waves with phase shift patterns. The overlapping spectrum is separately reconstructed to obtain the images with different high-frequency and low-frequency bandpass spectrum coverage. This will make the proposed method and apparatus of structured illumination digital holography avoid time-multiplexing restriction of shooting multiple sheets of phase shift patterns, and further realize high spatial resolution wavefront reconstruction of single exposure.

FIG. 1 shows an apparatus of a structured illumination digital holography in accordance with one embodiment of the present invention. In this embodiment, the structured illumination pattern will function with the object light wave to generate different high frequency and low frequency bandpass spectrum. The bandpass spectrum of the object waves can be used to synthesize spectrum in order to expand the spectrum coverage and achieve the purpose of enhancing the spatial resolution of the reconstructed images.

The present invention proposes using at least two sheets of binary random number encoding to sample at least two sheets of phase shift patterns. In one embodiment, the structured illumination pattern uses second order phase grating with phase difference it to function as the input pattern of a structured illumination generating unit, and the pattern can be expressed as follows:

$$g(y) = \left\{ \left[ rect\left(\frac{y}{w}\right) \otimes \delta(y) \right] + \left[ rect\left(\frac{y}{w}\right) \otimes \delta(y-w) \right] \cdot \exp(i\pi) \right\} \otimes comb\left(\frac{y}{\Lambda}\right) \otimes h_{TL}(y).$$

$\Lambda = 2w$ is the period of the grating, and $h_{TL}(y)$ is a point spread function of a telescopic imaging system. Fourier transformation of the structured illumination pattern can be expressed in term of different grating order as follows:

$$\tilde{g}(v)\Big|_{v=\frac{m}{\Lambda}} = \left\{ \frac{1}{2} \operatorname{sinc}(\pi w v) \cdot [\exp(+i\pi w v) - \exp(-i\pi w v)] \right\} \cdot \tilde{h}_{TL}(v).$$

The diffraction order of the structured illumination pattern is m, and the maximum diffraction efficiency of output can be achieved at $\pm 1^{st}$ diffraction order. The coherent transfer function of the telescopic imaging system is $\tilde{h}_{TL}(v)$. The spatial frequency of the grating period is set as the maximum acceptable angle of the coherent transfer function in order to cut off the noise interference caused by each higher order diffraction term. The binary random number encoding pattern is passing through an optical relay objective lens set to modulate the structured object wave, and spatial multiplexing of $\pm 1^{st}$ diffraction order is performed to form an object wave with an encoded structured illumination pattern. Wherein, the random number encoding unit generates a binary phase encoded pattern, and functions on the object wave at $-1^{st}$ diffraction order to form the encoded object wave, which can be expressed as follows:

$$o_{-1^{st}}(x, y) = \left\{ \exp\left[i2\pi\left(\frac{x}{\lambda} + \frac{\sin\theta_m y}{\lambda}\right)\right] o_d(x, y) \right\} \otimes h_{TL}(x, y) \cdot \exp[i\Phi_n(x, y)],$$

$\exp[i\Phi_n(x, y)]$ is the binary phase encoding pattern, and $\sin\theta_m$ is a diffraction angle of the grating period. The object $o_d(x, y)$ locates on a defocused plane for performing a compressive sensing algorithm which can be expressed as follows:

$$o_d(x, y) = \frac{e^{jkz_R}}{j\lambda z_R} e^{j\frac{k}{2z_R}(x^2+y^2)} \int\int_{-\infty}^{\infty} \left\{ o(\xi, \eta) e^{j\frac{k}{2z_R}(\xi^2+\eta^2)} \right\} e^{-j\frac{k}{2z_R}(x\xi+y\eta)} d\xi d\eta.$$

$z_R$ is the diffraction distance, and $o(\xi,\eta)$ is the original object. The encoded object wave is interfered with the object wave at +1$^{st}$ diffraction order to form the encoded structured illumination object wave, and then interfering with the off-axis reference wave to form a digital hologram. The encoded structured illumination object wave by wavefront reconstruction describes as follows:

$$o_{S_n}(x, y)r^*(x, y) = \{o_{+1^{st}}(x', y') + o_{-1^{st}}(x', y')\exp[i\Phi_n(x', y')]\}$$
$$\exp\left[-j2\pi\left(\frac{\sin\theta_{x'}x'}{\lambda} + \frac{\sin\theta_{y'}y'}{\lambda}\right)\right].$$

The incident angle of the off-axis reference beam is $\sin\theta_{x'}$ and $\sin\theta_{y'}$, and the coherent transfer function of the illuminating objective lens set (first telescopic imaging system) and the receiving objective lens set (second telescopic imaging system), and the reconstruction information of the encoded object wave can be obtained after numerical correction of the reference wave, which includes the following:

$$\tilde{o}_s(u,v) = \tilde{h}_{TL_1}(f_{SI}, 0)\tilde{h}_{TL_2}(u,v)\tilde{o}_{+1^{st}}(u-f_{SI},v) + \tilde{h}_{TL_1}(0,f_{SI})$$
$$\tilde{h}_{TL_2}(u,v)\tilde{o}_{-1^{st}}(u,v-f_{SI})\exp[i\Phi_n(u,v)].$$

$\tilde{h}_{TL_1}(f_{SI}, 0)$ is the coherent transfer function of the illuminating objective lens set, $\tilde{h}_{TL_2}(u, v)$ is the coherent transfer function of the receiving objective lens set, and the spectrum coverage of the encoded object wave is $\tilde{o}_{+1^{st}}(u-f_{SI}, v)$ and $\tilde{o}_{-1^{st}}(u, v-f_{SI})$, respectively. However, the encoded structure with binary phase pattern can be applied to the compressive sensing algorithm to recover object wave with two sheets of phase shift patterns. The object wave at ±1$^{st}$ diffraction order is determined by a SVD and a pseudo-inverse matrix operation, which describes as following:

$$\begin{bmatrix} 1 & \exp(i\Phi_1) \\ 1 & \exp(i\Phi_2) \end{bmatrix} \cdot \begin{bmatrix} \tilde{h}_{TL_1}(f_{SI}, 0)\tilde{h}_{TL_2}(u,v)\tilde{o}_{+1^{st}}(u-f_{SI},v) \\ \tilde{h}_{TL_1}(0, f_{SI})\tilde{h}_{TL_2}(u,v)\tilde{o}_{-1^{st}}(u,v-f_{SI}) \end{bmatrix} = \begin{bmatrix} \tilde{o}_{s_1}(u,v) \\ \tilde{o}_{s_2}(u,v) \end{bmatrix}.$$

$\tilde{o}_{s_1}(u, v)$ and $\tilde{o}_{s_2}(u, v)$ are object wave with two sheets of phase shift patterns recovered by the compressive sensing algorithm. $\exp(i\Phi_1)$ and $\exp(i\Phi_1)$ are the phase shift by binary phase pattern encoding. Therefore, the bandpass spectrum is performed by separately reconstructing of spectrum overlapping to obtain different high frequency and low frequency band-pass spectrum, and the composite spectrum in frequency domain will be available to enhance the spectrum coverage, which is expressed as:

$$o_{SA}(x',y') = \Im^{-1}\{\tilde{o}_{+1^{st}}(u-f_{SI},v) + \tilde{o}_{-1^{st}}(u,v-f_{SI})\}.$$

The composite spectrum obtained by expanding the spectrum coverage can be used to achieve the reconstructed object images of microscopy and tomography with high spatial resolution.

As shown in FIG. 1, it shows an apparatus of structured illumination digital holography according to one embodiment of the present invention. The present invention is utilized to process a single sheet of digital holographic reconstruction images, and the digital hologram is generated by an optical system of FIG. 1. For example, the optical system includes a light source 100, a spatial filter (SF) 101, three beam splitters 102, 104 and 118, two spatial light modulators 105 and 121, an illuminating objective lens set (TL1), a receiving objective lens set (TL2), a photodetector array 106 (for example: Charge-coupled device (CCD), Complementary Metal-Oxide-Semiconductor (CMOS) image sensor, photodetector), four polarizers 107, 108, 116 and 125, three mirrors 109, 110 and 124, and a beam expander 111. For example, the illuminating objective lens set (TL1) includes a lens 112 with focal length of 200 mm (millimeter) and microscope objective lens 113 and 114 with numerical aperture (NA) of 0.25. The front and rear focal length of the lens 112 can be equal or substantially equal (with a slight difference), and the front and rear focal length of the microscope objective lens 113 can be equal or substantially equal (with a slight difference). The receiving objective lens set (TL2) includes a microscope objective lens 114 with numerical aperture (NA) of 0.25 and a lens 115 with focal length of 200 mm (millimeter). The front and rear focal length of the microscope objective lens 114 can be equal or substantially equal (with a slight difference), and the front and rear focal length of the lens 115 can be equal or substantially equal (with a slight difference). The reference beam 130 can be a plane wave distribution, or a spherical wave distribution. In one embodiment, the illuminating objective lens set (TL1) may be a telescopic imaging system (optical image resizing system), and the receiving objective lens set (TL2) may be an optical relay system.

The light source 100 includes a vertical-cavity surface-emitting laser (VCSEL), a semiconductor laser, a solid-state laser, a gas laser, a dye laser, a fiber laser or light emitting diodes (LED). The emission type of the light source 100 comprises a light source, a planar light source or a spherical light source. The light source 100 includes coherent light source, low coherent light source or incoherent light source. For example, the light source 100 is a diode-pumped solid-state (DPSS) laser device. In one embodiment, the DPSS laser device emits a laser beam with center wavelength of 532 nm (nanometer). The optical path of the optical system includes: a diode laser emits a probe beam with a specific central wavelength, the probe beam passing through the spatial filter (SF) 101 and the beam expander (such as lens) 111 to generate a full expansion beam (such as collimated planar wave), then incident into the mirror 109 for reflecting and reaching to the beam splitter 102 to output two beams respectively. One beam 120 of the two beams is passing through the polarizer 107 to change polarization state of the incident beam, and then passing through the beam splitter 102 for incident to the spatial light modulator 105 to create a structured illumination pattern. Besides, the incident beam 120 is reflecting to the polarizer 108, and therefore output of phase modulation mode is realized. Then, the illumination objective lens set TL1 (112 and 113) outputs the structured illumination pattern for illuminating an object 150 to be measured, and an encoded structured illumination object wave is formed. The at least two sheets of structured illumination pattern with phase shift are synthesized to form a single sheet of encoded structured illumination pattern. That is, the single sheet of encoded structured illumination pattern with phase shift illuminates on the object 150 to be measured, to form the structured object wave, wherein the object is placed in the Fresnel region. Next, the object wave is microscopically imaged by the receiving objective lens set TL2 (114 and 115). Subsequently, the optical Fourier transformation of the structured object wave is performed by passing through the lens 117 to form +1$^{st}$ order and −1$^{st}$ order diffraction light, followed by passing through the beam splitter 118 to divide into two beams of transmission and reflection. The reflected beam is passing through a spatial optical mask (Y direction, optical stop) 119 to eliminate the negative first-order (−1$^{st}$) diffraction light (for blocking +1$^{st}$ order diffraction term, and −1$^{st}$ order diffraction term passing through). The transmitted beam is passing through a spatial optical mask (x direction, optical stop) 122 to eliminate the positive first-order (+1$^{st}$) diffraction light (for blocking +1$^{st}$ order diffraction term, and −1$^{st}$ order diffraction team passing through). The black dot represents the optical stop for blocking light, and the white region in circle indicates the rest of light passing through therein. The positive first-order (+1$^{st}$) diffracted light wave passes through the lens 160 and is imaged to the binary random number encoding generating unit 121 to sample the structured object wave. The polarizer (polarizing plate) 116 and 125 are used to modulate the optical characteristics of the binary random number encoding generation unit 121. Similarly, the transmitted beam is passing through an optical mask to eliminate the positive first-order (+1$^{st}$) diffracted light wave, while the negative first order (−1$^{st}$) diffracted light wave passes through the lens 123 and is imaged onto the mirror 124. The positive first-order (+1$^{st}$) diffracted light wave modulated by the binary random number encoding generation unit and the negative first-order (−1$^{st}$) diffraction light will be reflecting and propagating along the original path, and combined together by the beam splitter 118 to form an encoding structured illumination object wave, and thereby imaging by the lens 126 to an image sensor 106. The other plane reference wave 130 is reflected by the mirror 110, and then incident to the beam splitter 104, and followed by incident to the image sensor 106. The reference wave and the normal incident object wave maintain off-axis angle for performing off-axis digital holographic recording, to ensure the object wave formed by the structured illumination pattern illuminating to the object 150 is maintained in off-axis recording structure with the reference wave, which can eliminate the dc term (zero-order) and conjugate term.

The structured illumination can be presented in the light wave form of amplitude or phase, while the binary random number encoding can be performed by the light wave form of amplitude or phase. The digital hologram can be formed in on-axis, off-axis, in-line or common-path optical scheme, and the reference wave can be planar, spherical, or arbitrary optical wave form. The apparatus of the structured illumination digital holography further includes a loading stage (not shown) to support (load) the object 150 to be measured, and a displacement mechanism for adjusting the x-y-z axis.

In some embodiments, the reference wave maintains off-axis angle with the object wave to perform off-axis digital holographic recording, in order to ensure that the dc term and conjugation term of off-axis recording can be eliminated in a standard resolution. As shown in FIG. 1, the above three mirrors 109, 110 and 124 are only used to redirect the optical path of the laser beam. The lens 111 can be regarded as the element which can generate the beam expanding wavefront (plane wave and spherical wave). The lens 112 and 115 can be regarded as the element which can generate a planar, a spherical and an arbitrary surface wavefront.

It should be noted that the optical system of FIG. 1 utilizes an improved Mach-Zehnder interferometer to implement a single sheet of structured illumination with encoding pattern for illuminating the object to interfere with off-axis reference wave for digital hologram recording. The convolution between the structured illumination pattern and the fringes of object to be measured may be performed to break the restriction of optical diffraction limit. In other embodiments, the digital holograms of structured illumination pattern may be utilized by other structured illuminating technologies, for example diffracted optical element combining with spatial multiplexing and angular multiplexing, and spatial light modulator, digital micromirror device to generate transmittance or reflectance digital hologram recording of on-axis, off-axis, in-line or common-path optical scheme.

Figure 2:
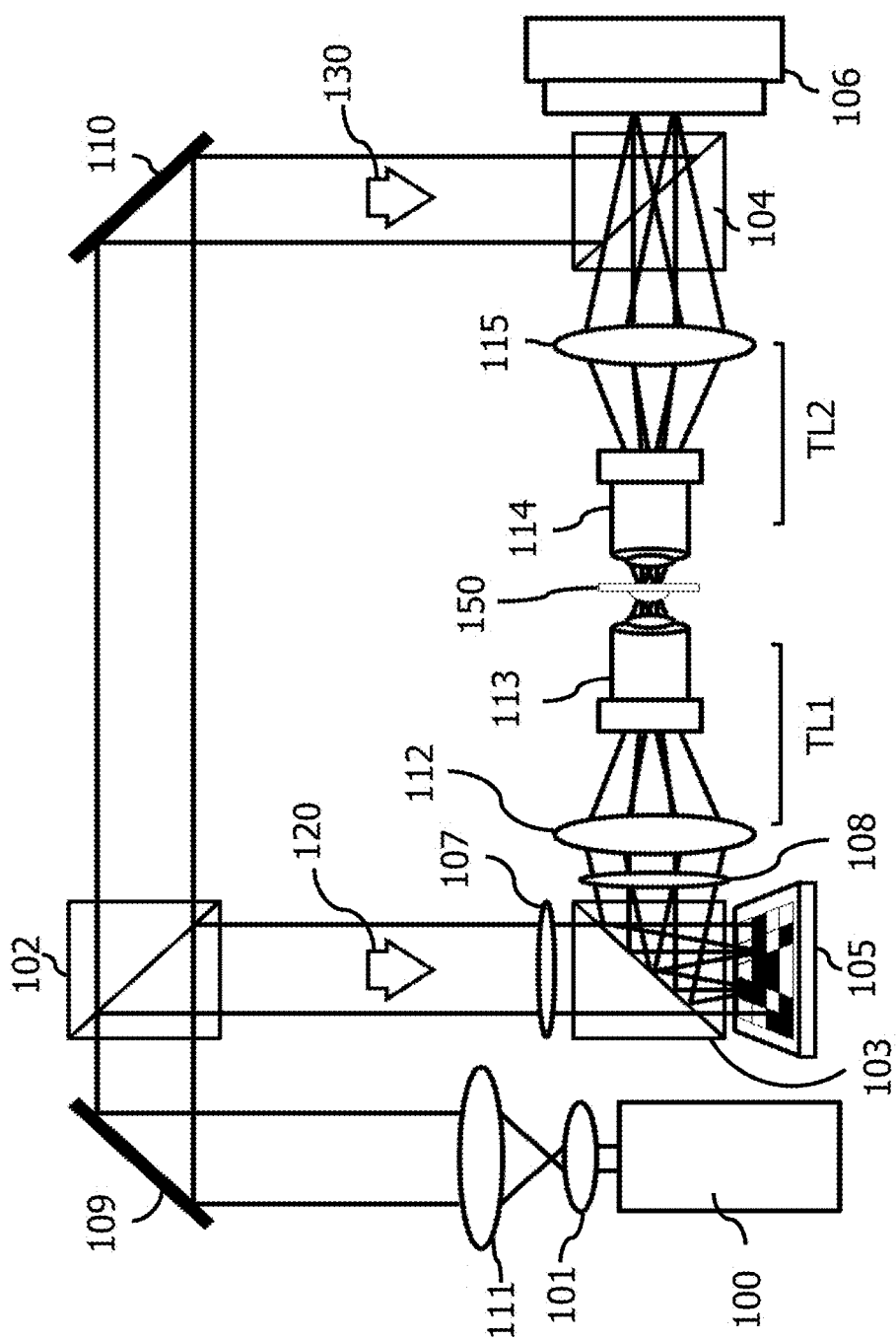
FIG. 2 illustrates an apparatus of structured illumination digital holography according to another embodiment of the present invention.
Figure 3:
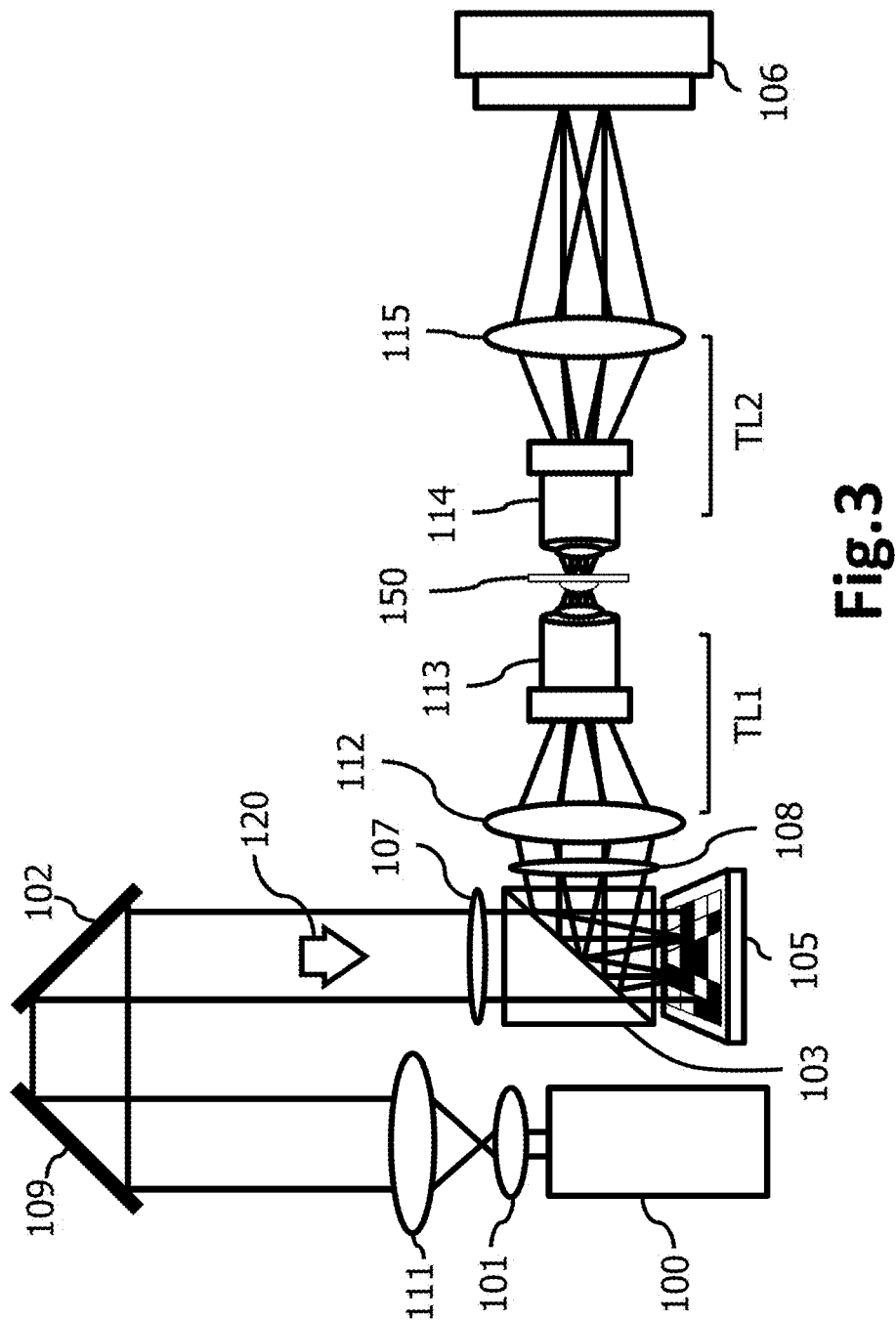
FIG. 3 illustrates an apparatus of structured illumination digital holography according to yet another embodiment of the present invention.

As shown in FIG. 2, it shows an apparatus of structured illumination digital holography according to another embodiment of the present invention. The present invention is utilized to process a single sheet of digital holographic reconstruction images of an object to be measured, and the digital holograms are generated by an optical system of FIG. 2. For example, the optical system includes a light source 100, a spatial filter (SF) 101, three beam splitters 102, 103 and 104, a spatial light modulator 105, an illuminating objective lens set (TL1), a receiving objective lens set (TL2), a photodetector array 106, two polarizers 107 and 108, two mirrors 109 and 110, and a beam expander 111. The descriptions of optical path of the optical system and the function of each component in FIG. 2 may be referred to FIG. 1. In another embodiment, as shown in FIG. 3, comparing with the FIG. 2, the optical system omits the beam splitters 102 and 104.

Figure 3A:
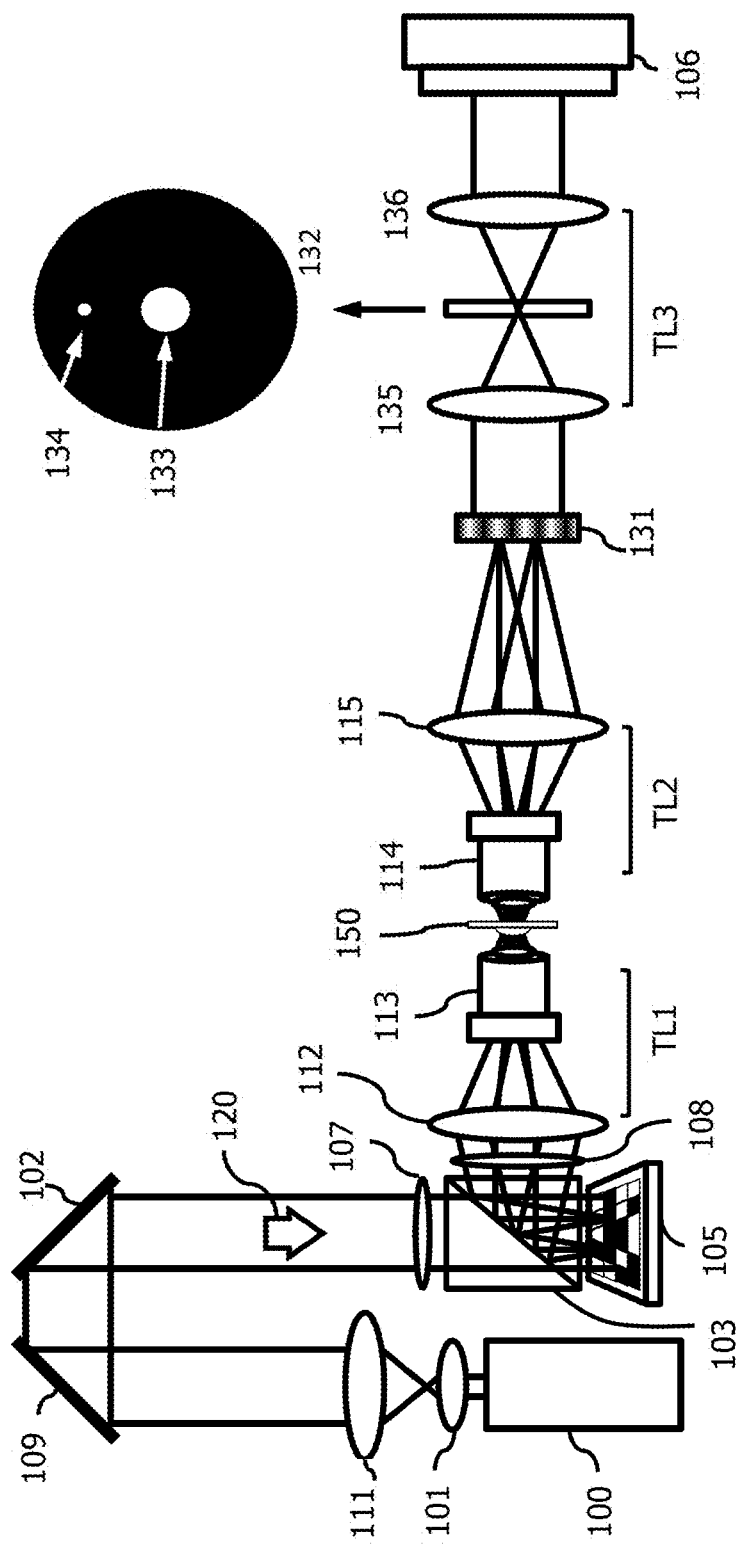
FIG. 3A illustrates an apparatus of structured illumination digital holography according to one embodiment of the present invention.

In another embodiment, as shown in FIG. 3A, the optical system omits the beam splitters 102 and 104, and adds an optical relay system (optical image resizing system) TL3, a grating 131 and a filter mask 132. The grating 131 is configured between the TL2 and the TL3, and the filter mask 132 is configured between the lens 135 and the lens 136 of the TL3. The filter mask 132 includes a first filtering region 133 and a second filtering region 134, wherein the first filtering region 133 allows the object wave to pass through and the second filtering region 134 allows the reference wave to pass through.

Figure 3B:
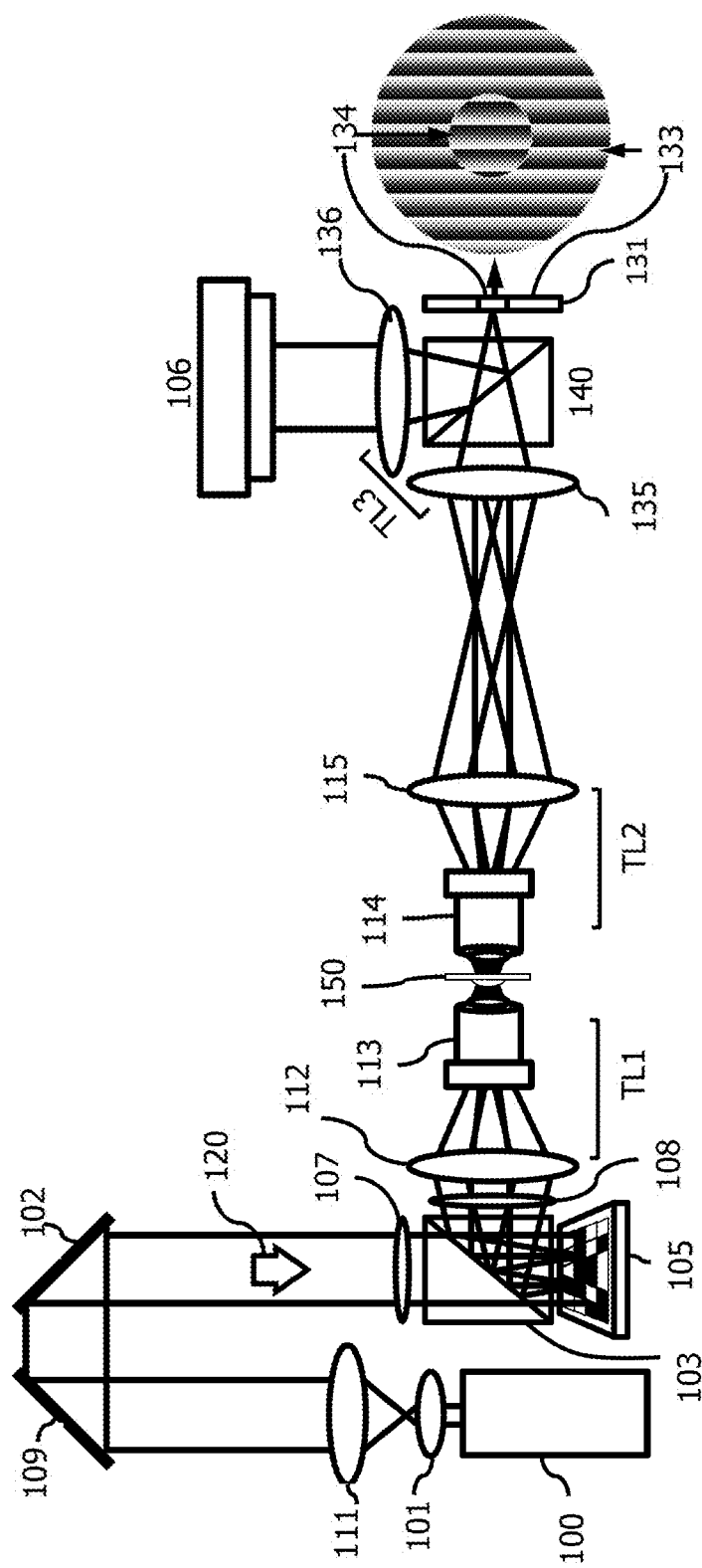
FIG. 3B illustrates an apparatus of structured illumination digital holography according to another embodiment of the present invention.

In another embodiment, as shown in FIG. 3B, the optical system omits the beam splitters 102 and 104, and adds an optical relay system (optical image resizing system) TL3, and a grating (such as blazed grating) 131. The TL3 includes a lens 135, a lens 136 and a beam splitter 140. The lens 135 is configured at left side of the beam splitter 140, and the lens 136 is configured at upper side of the beam splitter 140. The beam splitter 140 is configured between the lens 135 and the grating 131. The grating 131 is configured at one side of the TL3, and a filter mask is embedded into the grating 131. The filter mask includes a first filtering region 133 and a second filtering region 134. The first filtering region 133 directs to outer area of the grating (outer grating) for modulating light by focusing to form an object wave, and the second filtering region 134 directs to central area of the grating (central grating) for modulating light by focusing to form a reference wave.

Figure 4:
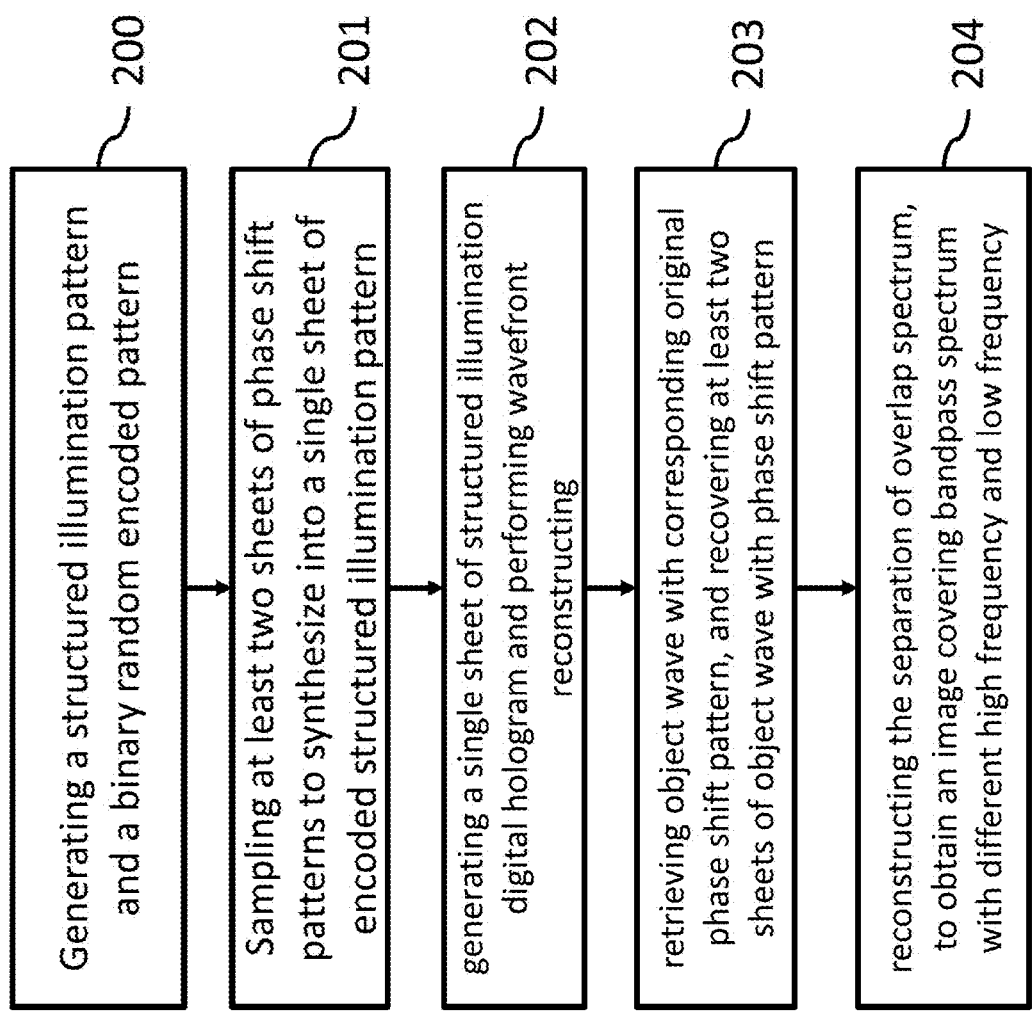
FIG. 4 illustrates the flow chart of forming the structured illumination digital holography according to the present invention.

As shown in FIG. 4, it shows a process flow of structured illumination digital holography according to the present invention. The method for structured illumination digital holography of the present invention includes steps 200~204. First, the step 200 is performed to generate a structured illumination pattern and a binary random number encoded pattern. In the step 200, it provides a structured illumination generating unit and a random number encoding unit to generate a structured illumination pattern for illuminating an object to be measured, and form an object wave with encoding structure (binary random number encoding pattern). The random number encoding unit is for example a binary random number encoding unit. The structured illumination generating unit and the binary random number encoding unit comprise photoelectric modulation elements, including a spatial light modulator, digital micromirror device, diffraction grating, to modulate light emitted by the light source to form a binary random number encoding pattern, a structured illumination pattern with arbitrary spatial frequency and orientation. In this embodiment, the phase-mode liquid crystal spatial light modulator is used to modulate light emitted by the light source to create a phase shift pattern and a binary random number encoding pattern; and spatial frequency and orientation of the patterns can be adjusted for illuminating the object to form the object wave with encoding structure.

Figure 6:
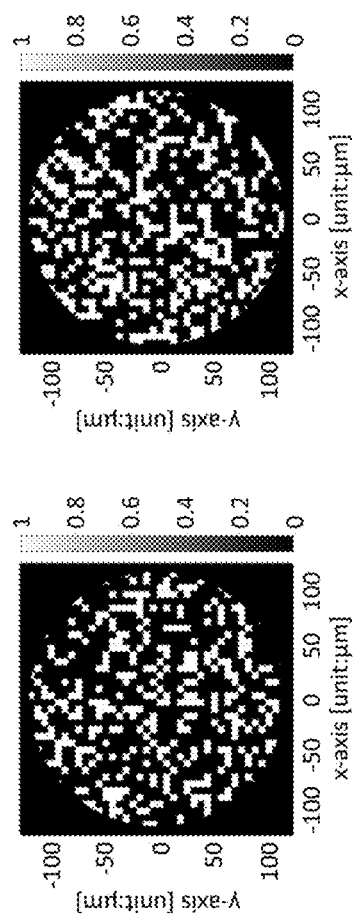
FIG. 6 illustrates two sheets of binary random number encoding patterns.
Figure 7:
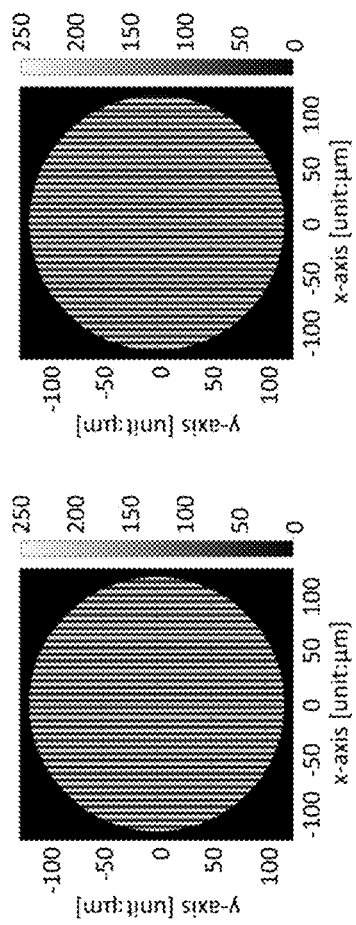
FIG. 7 illustrates two sheets of patterns with phase shift.
Figure 8:
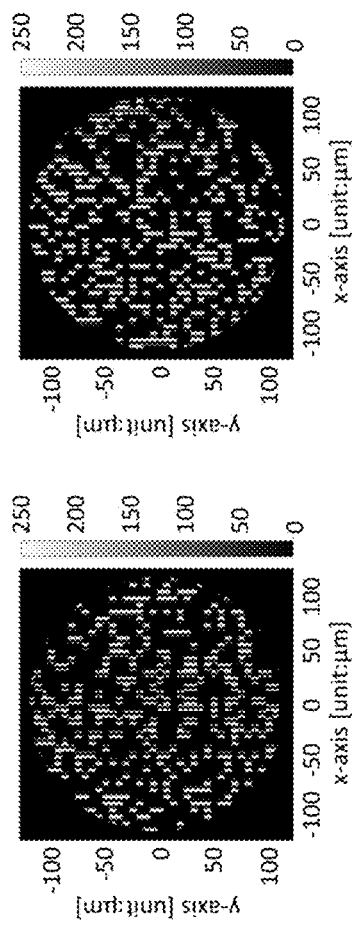
FIG. 8 illustrates the structured illumination pattern of two sheets of phase shift patterns sampled by binary random number encoding pattern.

Next, in the step 201, based-on at least two sheets of the binary random number encoding patterns, at least two sheets of phase shift patterns are sampled and synthesized into a single sheet of encoded structured illumination pattern for illuminating the object. In this embodiment, the binary random number encoding unit is used to generate two sheets of binary random number encoding patterns, and the sampling points of the binary random number encoding patterns are not duplicated with each other. The FIG. 6 to the FIG. 8 show the encoding of structured illumination pattern, in which the FIG. 6 includes two sheets of binary random number encoded patterns. Then, a structured illumination generating unit is used to output two sheets of phase shift patterns. The phase shift patterns are shown in FIG. 7, in which the left part is a pattern with 0 degree phase shift and the right part is a pattern with 120 degree phase shift. The FIG. 7 shows two sheets of phase shift patterns, which are sampled by binary random number encoding pattern to become an encoded structured illumination pattern shown in FIG. 8. The encoded structured illumination pattern can be synthesized into a single sheet of structured illumination pattern with two sheets of phase shift encoding, which can be an imaging or non-imaging diffraction wave. The FIG. 8 shows the structured illumination pattern of two sheets of phase shift patterns after sampling by binary random number encoding pattern.

Figures 9A, 9B:
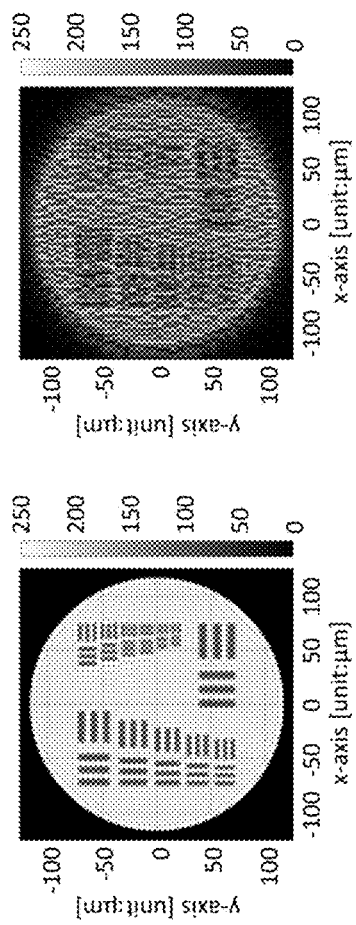
FIG. 9A illustrates the image information of an object to be measured according to the present invention.
FIG. 9B illustrates a single sheet of encoded structured object wave according to the present invention.

Then, in the step 202, the single sheet of structured illumination pattern with two sheets of phase shift encoding illuminates an object to be measured, in order to form an encoding structured object wave which interferes with the reference wave to generate a single sheet of structured illumination digital hologram, and then performing wavefront reconstructing. The single sheet of structured illumination digital hologram can be formed in on-axis, off-axis, in-line or common-path optical scheme. The method of wavefront reconstructing includes temporal filtering, spatial filtering and phase retrieval. In this embodiment, the structured illumination pattern with phase shift encoding is image-reducing by the illuminating objective lens set TL1 on the object to be measured, as shown in FIG. 9A, and then image magnified object wave of the encoded structured illumination by the receiving objective lens set TL2 on the middle image plane; and followed by propagating to the Fresnel diffraction region to form encoded structured object wave, as shown in FIG. 9B, and interfering with off-axis reference wave for performing wavefront reconstructing of spatial filtering. FIGS. 9A and 9B show the encoding of a single sheet of encoded structured object wave, in which the FIG. 9A includes the image information of the object to be tested and FIG. 9B includes the single sheet of encoded structured object wave.

The optical wave diffraction is for example Fresnel diffraction or Fraunhofer diffraction. In this embodiment, the diffraction information is imaged to the intermediate image plane of the object, and low-frequency diffraction fringe information is generated on Fresnel region in a diffracting distance to solve the problem of actual pixel size limit of the photodetector array.

Figures 11A, 11B:
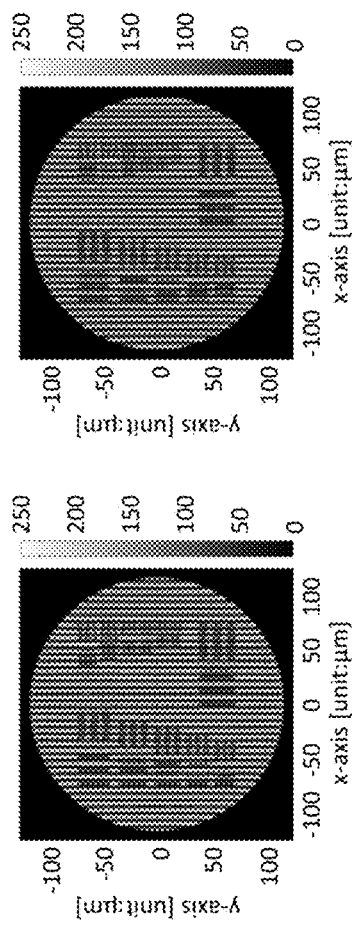
FIG. 11A and FIG. 11B illustrate 0 degree phase shift encoded pattern and 120 degree phase shift encoded pattern performed by compressive sensing algorithm to recover object wave with two sheets of phase shift patterns.

Subsequently, in the step 203, binary random number decoding the pattern (single sheet of digital hologram) of encoded structured object wave wavefront reconstructed is performed to retrieve the object wave with corresponding original phase shift pattern, and an image processing method is performed to recover the object wave with at least two sheets of phase shift patterns. In one embodiment, the image processing method includes compressive sensing, de-convolution, or interpolation. The pattern of the encoded structured object wave been wavefront reconstructed is by using binary random number decoding the pattern to extract the object wave with corresponding original phase shift pattern, as shown in FIG. 10A to 10B. FIG. 10A and FIG. 10B show the extracted object wave with corresponding original phase shift pattern by binary random number decoding, in which the object wave with corresponding original phase shift pattern has 0 degree phase shift and 120 degree phase shift, respectively. The object wave with phase shift pattern is performed by compressive sensing algorithm to recover the object wave with two sheets of phase shift patterns shown in FIGS. 11A and 11B, which include object wave reconstructing image with 0 degree phase shift encoded pattern and 120 degree phase shift encoded pattern, respectively.

Figures 12A, 12B:
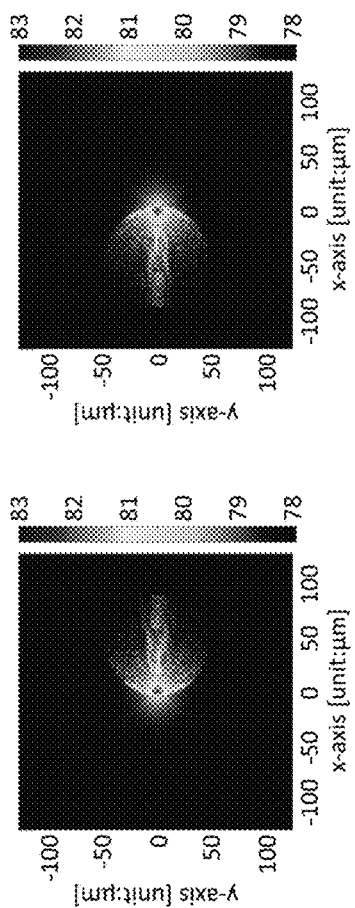
FIG. 12A and FIG. 12B illustrate the corresponding bandpass spectrum of diffraction order positive one ($+1^{st}$) and negative one ($-1^{st}$), respectively.
Figures 13A, 13B:
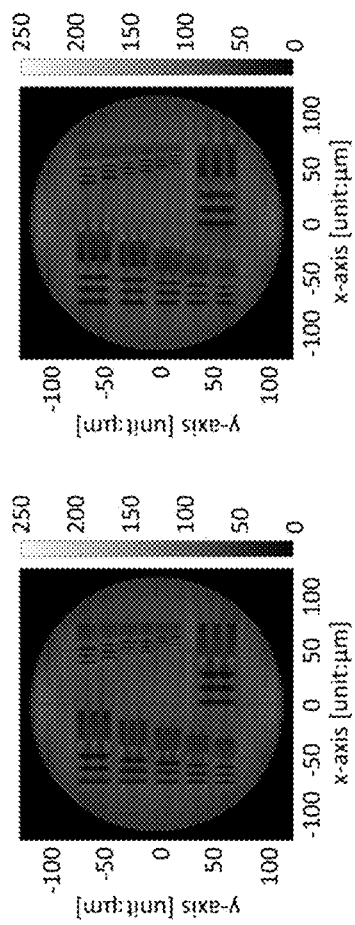
FIG. 13A and FIG. 13B illustrate the reconstructed amplitude image of diffraction order positive one ($+1^{st}$) and negative one ($-1^{st}$), respectively.
Figures 14A, 14B, 14C:
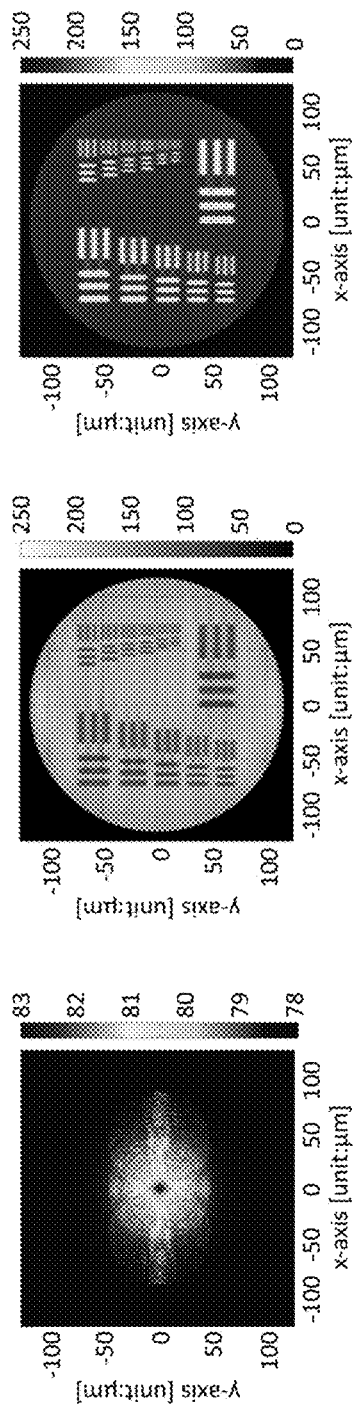
FIG. 14A illustrates a two-dimensional synthetic spectrum covering range of wavefront imaging with two-dimensional high spatial resolution synthesized by two-dimensional Fourier transformation.
FIG. 14B illustrates a two-dimensional synthetic reconstructed amplitude image of wavefront imaging with two-dimensional high spatial resolution synthesized by two-dimensional Fourier transformation.
FIG. 14C illustrates a two-dimensional synthetic reconstructed phase image of wavefront imaging with two-dimensional high spatial resolution synthesized by two-dimensional Fourier transformation.
Figure 15:
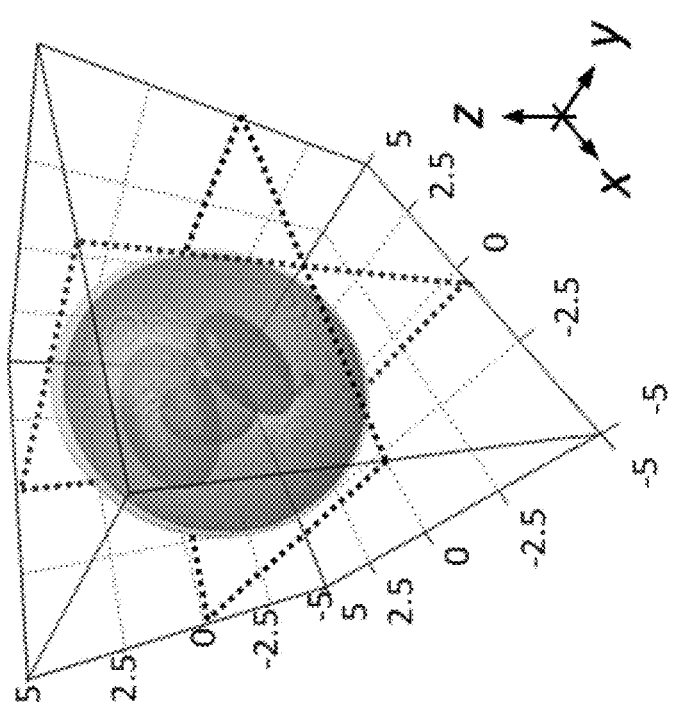
FIG. 15 illustrates a simulation of 3D object by three-dimensional Fourier spectral synthesis.
Figure 16A:
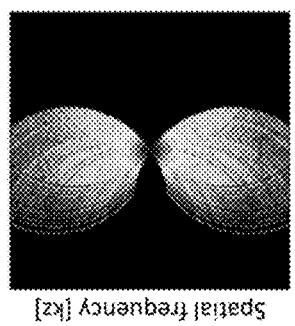
FIG. 16A illustrates the coverage of the 3D synthetic spectrum in X-Y space.
Figure 16B:
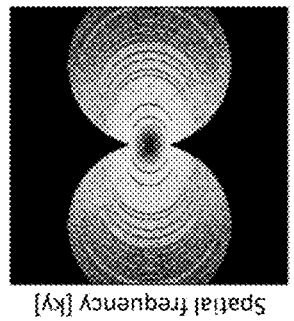
FIG. 16B illustrates the coverage of the 3D synthetic spectrum in the Y-Z space.
Figure 16C:
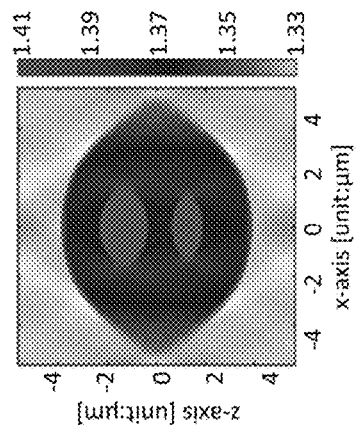
FIG. 16C illustrates the tomographic reconstruction images of the three-dimensional synthetic spectrum in the X-Y space of the refractive index.
Figure 16D:
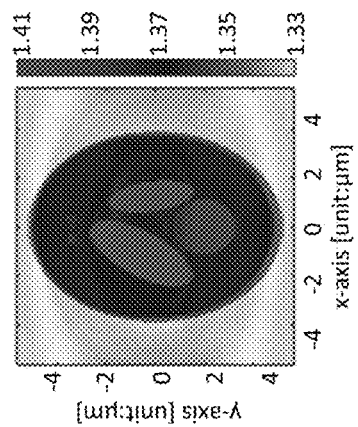
FIG. 16D illustrates the tomographic reconstruction images of the three-dimensional synthetic spectrum in the Y-Z space of the refractive index.

Finally, in the step 204, it is reconstructing the separation of overlap spectrum of the object wave with at least two sheets of phase shift patterns to obtain an image covering bandpass spectrum with different high frequency and low frequency. In this embodiment, FIG. 12A to FIG. 13B shows the image covering bandpass spectrum with different high frequency and low frequency obtained by reconstructing the separation of overlap spectrum. The FIG. 12A and FIG. 12B show the corresponding bandpass spectrum of diffraction order positive one ($+1^{st}$) and negative one ($-1^{st}$), respectively. The FIG. 13A and FIG. 13B show the reconstructed amplitude image of diffraction order positive one ($+1^{st}$) and negative one (−1st), respectively. The bandpass spectrum can be synthesized by two-dimensional Fourier transformation to form two-dimensional wavefront imaging with high spatial resolution, as shown in FIG. 14A to FIG. 14B. The FIG. 14A shows a two-dimensional synthetic spectrum covering range, the FIG. 14B shows a composite reconstructed amplitude image, and the FIG. 14C is a composite reconstructed phase image. In another embodiment, a three-dimensional Fourier transformation is performed to achieve tomography. As shown in FIG. 15, it shows a simulation of 3D object by three-dimensional Fourier spectral synthesis to obtain reconstructed tomographic images of three-dimensional synthetic spectrum, as shown in FIG. 16C and FIG. 16D. FIG. 16A shows the coverage of the 3D synthetic spectrum in X-Y space, while the FIG. 16B shows the coverage of the 3D synthetic spectrum in the Y-Z space. FIG. 16C shows the tomographic reconstruction images of the three-dimensional synthetic spectrum in the X-Y space of the refractive index, and the FIG. 16D shows the tomographic reconstruction images of the three-dimensional synthetic spectrum in the Y-Z space of the refractive index.

As mentioned above, the FIG. 6 to the FIG. 16D are mainly utilizing a computer simulation to obtain digital hologram created by the apparatus of structured illumination digital holography. The method of structured illumination digital holography is used to obtain a synthetic spectrum with different high-frequency and low-frequency bandpass spectrum coverage and its high spatial resolution reconstruction images. In the computer simulation of the present invention, the spectrum coverage of the structured illumination digital holography is provided, and the performance of the structured illumination projection fringes in the spatial resolution is provided. In one embodiment, center wavelength of the simulation light source is 532 nm (nanometer), pixel size $\Delta x = 0.26$ µm (micron), the sampling quantity is 1538×1538. The test samples contain several bright and dark fringes (stripes) with different spatial frequencies, including 5.4, 3.6 and 1.8 µm (micron) line pairs, for comparing the amplitude and phase images with high spatial resolution by synthesizing spectrum after structured illumination irradiating. The numerical aperture (NA) of the receiving objective lens set is set as 0.12 in the simulation. When the zero order ($0^{th}$) diffraction term is incident to an object to be measured, an ideal resolution can reach 3.4 µm (micron), as shown in FIG. 13A. Then, the positive one and negative one order ($\pm1^{st}$) diffraction term is incident to an object to be measured, the spatial resolution can reach 1.7 µm (micron), as shown in FIG. 14B.

Figure 5:
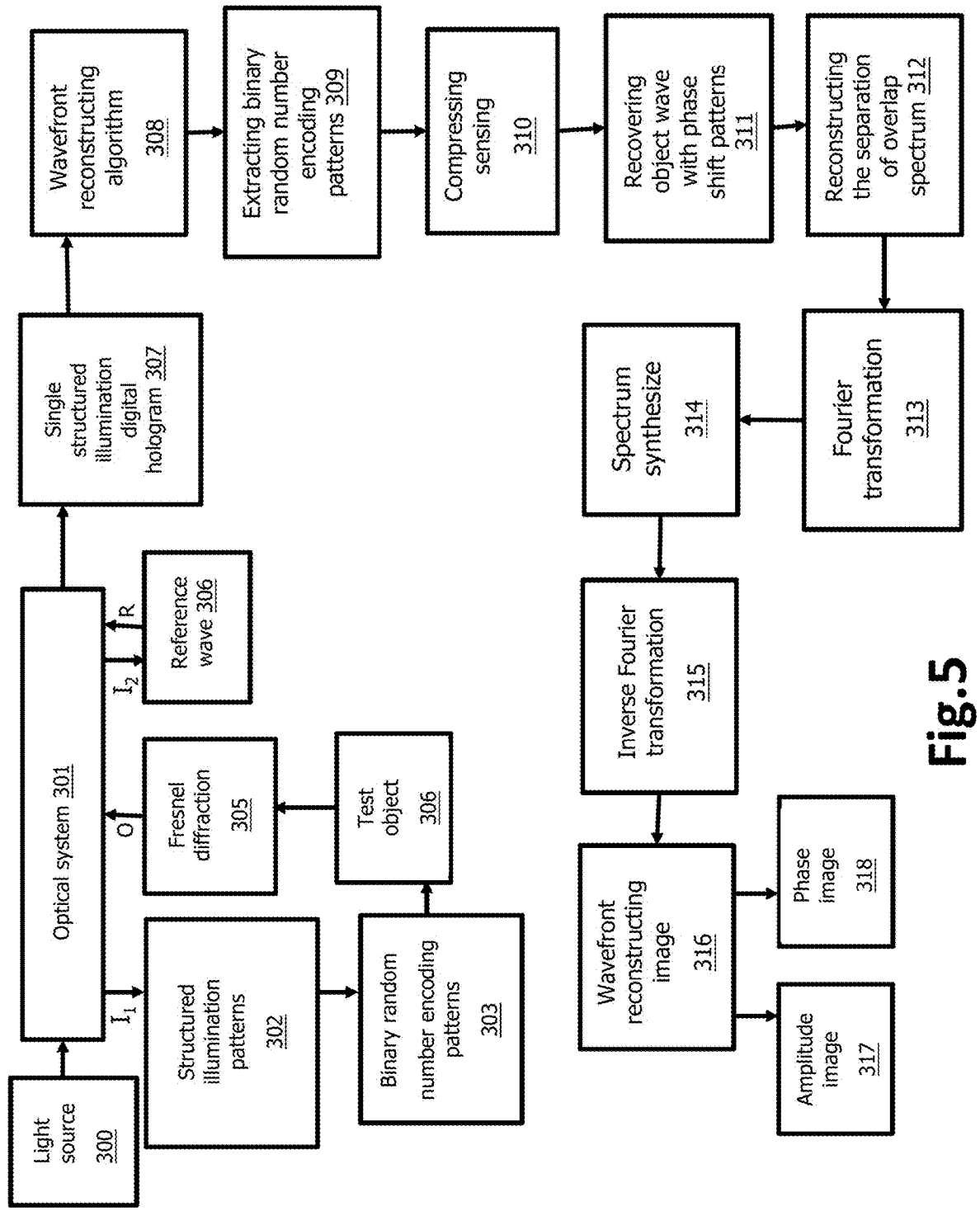
FIG. 5 illustrates the detailed flow chart of forming the structured illumination digital holography according to the present invention.

The FIG. 5 shows a detailed flow chart of method of structured illumination digital holography in accordance with one embodiment of the present invention. The light source 300 generates an optical beam to incident to an optical system 301, and outputs two beams (I1, I2) of light respectively by a beam splitter. One beam (I1) of the two beams generates at least two sheets of structured patterns with spatial frequency 302, while the other beam (I2) is used as a reference wave 306. Next, a binary random number encoding unit is used to generate at least two sheets of binary random number encoded patterns 303. Then, a single sheet of structured illumination pattern is illuminated on an object 304 to be measured to form an encoded structured object wave. Then, the encoded structured object wave is subjected to Fresnel diffraction 305 to propagate to the Fresnel region. The encoded structured object wave by Fresnel diffraction 305 and the reference wave 306 will simultaneously reach an image sensor of the optical system 301 for digital holographic recording to produce a single sheet of the structured illumination digital hologram 307. Next, the single sheet of the structured illumination digital hologram is performing by a wavefront reconstructing algorithm 308, which contains plural diffraction terms of different orders. Then, at least two sheets of binary random number encoding patterns 309 are retrieved to perform subsequent compressive sensing 310. After the compressing sensing approach, at least two sheets of object wave with phase shift patterns are recovered 311. Subsequently, the object wave of at least two sheets of phase shift patterns is reconstructing the separation of overlap spectrum 312. Next, a two-dimensional or three-dimensional Fourier transformation approach 313 is performed to achieve super-resolution and tomography. Then, the step 314 is performing spectral overlapping/superposition to synthesize the spatial coverage of the spectrum. In the following, the inverse Fourier transformation approach 315 is performed to form a wavefront reconstructing image 316 with high spatial resolution. The wavefront reconstructed images include amplitude images 317 and phase images 318.

To summarized, the method and apparatus of the invention of structured illumination digital holography utilizes convolution between object wave and structured illumination pattern to expand the spectrum covering range, and performs 2D and 3D Fourier spectrum synthesis; and the wavefront reconstruction of microscopic and tomographic image of the test object can be made, and therefore the purpose of invention is achieved.

The method and apparatus for structured illumination digital holography of the present invention can be applied to at least the following technical fields:
(1) optical element: defect detection of transparent glass substrate, detection of microlens array, gluing flatness detection of integrated circuit (IC), defect, particles, scratch, crack detection of photoelectric element, and voids detection of silicon substrate.
(2) integrated circuits and semiconductor components: linewidth, line height, diameter, 3D surface topography, step height, overlap of layers, breaking height, slope, volume, surface area, vibration modes.
(3) micro optics: surface defect detection, surface roughness, surface profile, film thickness and roughness, curvature radius, wavefront measurement, aberration analysis, distribution of refractive index (can be used to detect internal refractive index distribution of optical fiber).
(4) imaging of biological cells: cell biology, observation of nerve cell, cell volume, cell morphology, biological sensors, biochip, detection and analysis of living cell, development and screening of drug.
(5) mobile phones and panels: three-dimensional surface topography, stress and deformation, mobile phone lens, defect detection, grease stain, fingerprint, crack, dispensing, solder paste, coating, smoothness, roughness, polishing.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. An imaging method of structured illumination digital holography, comprising
    (a) providing a structured illumination generating unit and a binary random number encoding unit to generate a structured illumination pattern;
    (b) based on at least two sheets of binary random number encoding patterns of said structured illumination pattern, sampling at least two sheets of patterns with phase shift to be synthesized as a single sheet of structured illumination pattern to be encoded;
    (c) interfering an encoded structured object wave with a reference wave to form a single sheet of digital hologram, and wavefront reconstructing said single sheet of digital hologram;
    (d) random number decoding said single sheet of digital hologram to extract object wave with corresponding original phase shift pattern, and performing an image processing approach to recover object wave with at least two sheets of phase shift patterns; and
    (e) reconstructing separation of overlap spectrum of said object wave with at least two sheets of phase shift patterns.

2. The method of claim 1, wherein said encoded structured object wave is formed by said single sheet of encoded structured illumination pattern illuminating an object.

3. The method of claim 1, wherein said random number decoding in said step (d) is binary random number decoding.

4. The method of claim 1, wherein said step (e) is to obtain an image covering bandpass spectrum with different high frequency and low frequency.

5. The method of claim 4, wherein said bandpass spectrum with different high frequency and low frequency includes two-dimensional or three-dimensional Fourier spectrum.

6. The method of claim 1, wherein said image processing approach in said step (d) includes a compressive sensing approach.

7. The method of claim 1, wherein said image processing approach in said step (d) includes a de-convolution approach.

8. The method of claim 1, wherein said image processing approach in said step (d) includes an interpolation approach.

* * * * *